US012597191B2

(12) United States Patent
Kim et al.

(10) Patent No.: US 12,597,191 B2
(45) Date of Patent: Apr. 7, 2026

(54) FACE IMAGE GENERATION METHOD AND DEVICE FOR GENERATING FULLY-CONTROLLABLE TALKING FACE

(71) Applicant: 42dot Inc., Seoul (KR)

(72) Inventors: Byeong Yeol Kim, Seoul (KR); Ji Hwan Park, Seoul (KR); You Shin Lim, Yongin-si (KR)

(73) Assignee: 42dot Inc., Seoul (KR)

( * ) Notice: Subject to any disclaimer, the term of this patent is extended or adjusted under 35 U.S.C. 154(b) by 189 days.

(21) Appl. No.: 18/625,648

(22) Filed: Apr. 3, 2024

(65) Prior Publication Data

US 2024/0346730 A1     Oct. 17, 2024

(30) Foreign Application Priority Data

Apr. 3, 2023   (KR) ........................ 10-2023-0043735
Apr. 3, 2024   (KR) ........................ 10-2024-0045062

(51) Int. Cl.
*G06T 13/20*       (2011.01)
*G06T 13/40*       (2011.01)

(52) U.S. Cl.
CPC ............ G06T 13/205 (2013.01); G06T 13/40 (2013.01)

(58) Field of Classification Search
CPC .............................. G06T 13/205; G06T 13/40
See application file for complete search history.

(56) References Cited

U.S. PATENT DOCUMENTS

| | | | |
|---|---|---|---|
| 11,417,053 B1 * | 8/2022 | Yang ........................ | A63F 13/67 |
| 2019/0279075 A1 * | 9/2019 | Liu ........................ | G06N 3/0464 |
| 2023/0343010 A1 * | 10/2023 | Kwatra .................... | G10L 21/10 |
| 2023/0351662 A1 * | 11/2023 | Sinha ........................ | G10L 25/63 |

FOREIGN PATENT DOCUMENTS

| | | | | |
|---|---|---|---|---|
| CN | 115100329 B | * | 4/2023 | ............. G06V 10/82 |

OTHER PUBLICATIONS

Anonymous ICCV submission "I Did Say That: Fully-Controllable Talking Face Generation" ICCV 2023 Submission #10602, pp. 1-10.

* cited by examiner

*Primary Examiner* — Daniel F Hajnik
*Assistant Examiner* — Joshua Jungwook Suo
(74) *Attorney, Agent, or Firm* — Banner & Witcoff, Ltd.

(57)     ABSTRACT

Provided are face image generation method and device for generating a controllable talking face image. The method includes: a face image generation method for generating a controllable talking face image, the method comprising: receiving a source image and a series of driving images, sampled from the same video, and input audio; acquiring a style latent code including a source latent code and a driving latent code by encoding the source image and the series of driving images into a visual space by a visual encoder; acquiring an audio feature including an audio latent code by encoding the input audio by an audio encoder; acquiring a canonical code by mapping the source latent code to a canonical space by a canonical encoder; acquiring a motion code by combining the driving latent code with the audio latent code, and mapping the combined code to a multimodal motion space by a multimodal motion encoder; acquiring a multimodal fused latent code by combining the canonical code with the motion code; and generating a talking face image by transferring the multimodal fused latent code to a generative adversarial network (GAN).

20 Claims, 10 Drawing Sheets

Source

Canonical (a)

Source

Canonical (b)

w/o
*Lortho*

FC-TFC
(Ours)

1

FACE IMAGE GENERATION METHOD AND DEVICE FOR GENERATING FULLY-CONTROLLABLE TALKING FACE

CROSS-REFERENCE TO RELATED APPLICATION

This application claims priority to and the benefit of Korean Patent Application No. 10-2023-0043735 filed in the Korean Intellectual Property Office on Apr. 3, 2023, and Korean Patent Application No. 10-2024-0045062 filed in the Korean Intellectual Property Office on Apr. 3, 2024, the entire contents of which are incorporated herein by reference.

BACKGROUND

(a) Field

The present disclosure relates to a method and a device for generating a controllable talking face image.

(b) Description of the Related Art

A technology for generating a talking face based on audio may have various applications in film and entertainment industries including a virtual assistant, a video conference, and dubbing. Such a technology may have a potential to revolutionize the industries by generating an animated face that closely match the audio being generated to thus not only provide a user with an attractive experience, but also make an interaction between a human and a machine more natural and immersive.

In this regard, there have been attempts in relation to deep learning-based talking face synthesis to use only a red-green-blue (RGB) format as a form of supervision to reconstruct a target video, or to spread more specific supervision by utilizing two-dimensional or three-dimensional structural information. However, these attempts need improvements to control a head posture or a detailed facial attribute. Meanwhile, as another attempt, there has been an effort to generate a talking face having very similar movement and identity from the target video. However, it is difficult to control the detailed facial attribute such as an eye movement. Alternatively, to generate various facial expressions in a clean background, it is necessary to physically separate facial components such as eyes, lips, and other facial areas. However, this method has a limitation of having to use a facial keypoint, thus making it difficult to be applied to an actual application.

SUMMARY

The present disclosure attempts to provide face image generation method and device which may solve a limitation of an existing method by generating a talking face by using all target movements such as a head posture, an eyebrow movement, eye blinking, and an eye movement without additional supervision for a facial keypoint or the like.

According to an embodiment, provided is a face image generation method for generating a controllable talking face image, the method including: receiving a source image and a series of driving images, sampled from the same video, and input audio; acquiring a style latent code including a source latent code and a driving latent code by encoding the source image and the series of driving images into a visual space by a visual encoder; acquiring an audio feature including an audio latent code by encoding the input audio by an audio encoder; acquiring a canonical code by mapping the source latent code to a canonical space by a canonical encoder; acquiring a motion code by combining the driving latent code with the audio latent code, and mapping the combined code to a multimodal motion space by a multimodal motion encoder; acquiring a multimodal fused latent code by combining the canonical code with the motion code; and generating a talking face image by transferring the multimodal fused latent code to a generative adversarial network (GAN).

In the acquiring of the multimodal fused latent code, the multimodal fused latent code may be acquired by combining the canonical code with the motion code by a linear operation.

In the acquiring of the multimodal fused latent code, the multimodal fused latent code may be acquired through 2-stage motion transfer according to Equation 1 below:

$$z_{s \to d} = z_{s \to c} + z_{c \to d} \qquad \text{(Equation 1)}$$

Here, $z_{s \to d}$ is the multimodal fused latent code, $z_{s \to c}$ is the canonical code and represents conversion from the source image to the canonical image, and $z_{c \to d}$ is the motion code and represents conversion from the canonical image to the series of driving images.

In the acquiring of the motion code, the motion code may be acquired according to Equation 2 below in order for the combined code to include only a motion feature when combining the driving latent code with the audio latent code:

$$z_{c \to d} = E_m(E_a(x_a) \oplus E_{inv}(x_d)) \qquad \text{(Equation 2)}$$

Here, $z_{c \to d}$ is the motion code, $E_m$ is the multimodal motion encoder, $E_a$ is the audio encoder, $E_{inv}$ is the visual encoder, $x_a$ is the input audio, $x_d$ represents the series of driving images, and $\oplus$ represents channel-wise concatenation.

The method may further include imposing a constraint to ensure orthogonality in which an identity feature and a motion feature are distinguished from each other between the canonical code and the motion code.

In the imposing of the constraint, orthogonality loss may be introduced according to Equation 3 below to ensure the orthogonality:

$$L_{ortho} = \frac{1}{N} \sum (z_{s \to c} \odot z_{c \to d}) \qquad \text{(Equation 3)}$$

Here, N is the number of channels of the latent code, $z_{s \to c}$ is the canonical code, $z_{c \to d}$ is the motion code, and $\odot$ represents Hadamard product.

The canonical encoder may include two multilayer perceptrons (MLPs).

The multimodal motion encoder may include three multilayer perceptrons.

In the generating of the talking face image, the talking face image may be generated by transferring the multimodal fused latent code refined through a temporal fusion layer to the GAN.

The temporal fusion layer may include a one-dimensional convolution layer.

According to an embodiment, provided is a face image generation device for generating a controllable talking face image, which executes a program code loaded in at least one memory device by at least one processor, wherein the program code is executed to receive a source image and a series of driving images, sampled from the same video, and input audio, acquire a style latent code including a source latent code and a driving latent code by encoding the source image and the series of driving images into a visual space by a visual encoder, acquire an audio feature including an audio latent code by encoding the input audio by an audio encoder, acquire a canonical code by mapping the source latent code to a canonical space by a canonical encoder, acquire a motion code by combining the driving latent code with the audio latent code, and mapping the combined code to a multimodal motion space by a multimodal motion encoder, acquire a multimodal fused latent code by combining the canonical code with the motion code, and generate a talking face image by transferring the multimodal fused latent code to a generative adversarial network (GAN).

To acquire the multimodal fused latent code may include that the multimodal fused latent code is acquired by combining the canonical code with the motion code by a linear operation.

To acquire the multimodal fused latent code may include that the multimodal fused latent code is acquired through 2-stage motion transfer according to Equation 1 below:

$$z_{s \to d} = z_{s \to c} + z_{c \to d} \qquad \text{(Equation 1)}$$

Here, $z_{s \to d}$ is the multimodal fused latent code, $z_{s \to c}$ is the canonical code and represents conversion from the source image to the canonical image, and $z_{c \to d}$ is the motion code and represents conversion from the canonical image to the series of driving images.

To acquire the motion code may include that the motion code is acquired according to Equation 2 below in order for the combined code to include only a motion feature when combining the driving latent code with the audio latent code:

$$z_{c \to d} = E_m(E_a(x_a) \oplus E_{inv}(x_d)) \qquad \text{(Equation 2)}$$

Here, $z_{c \to d}$ is the motion code, $E_m$ is the multimodal motion encoder, $E_a$ is the audio encoder, $E_{inv}$ is the visual encoder, $x_a$ is the input audio, $x_d$ represents the series of driving images, and $\oplus$ represents channel-wise concatenation.

The program code may be executed to impose a constraint to ensure orthogonality in which an identity feature and a motion feature are distinguished from each other between the canonical code and the motion code.

To impose the constraint may include that orthogonality loss is introduced according to Equation 3 below to ensure the orthogonality:

$$L_{ortho} = \frac{1}{N} \sum (z_{s \to c} \odot z_{c \to d}) \qquad \text{(Equation 3)}$$

Here, N is the number of channels of the latent code, $z_{s \to c}$ is the canonical code, $z_{c \to d}$ is the motion code, and $\odot$ represents Hadamard product.

The canonical encoder may include two multilayer perceptrons (MLPs).

The multimodal motion encoder may include three multilayer perceptrons.

To generate the talking face image may include that the talking face image is generated by transferring the multimodal fused latent code refined through a temporal fusion layer to the GAN.

The temporal fusion layer may include a one-dimensional convolution layer.

BRIEF DESCRIPTION OF THE DRAWINGS

FIGS. 2, 3, 4, and 5 are diagrams for explaining the face image generation device according to an embodiment.

FIGS. 7, 8, and 9 are diagrams for explaining effective aspects of the face image generation device and method according to the embodiments.

DETAILED DESCRIPTION

Figure 1:
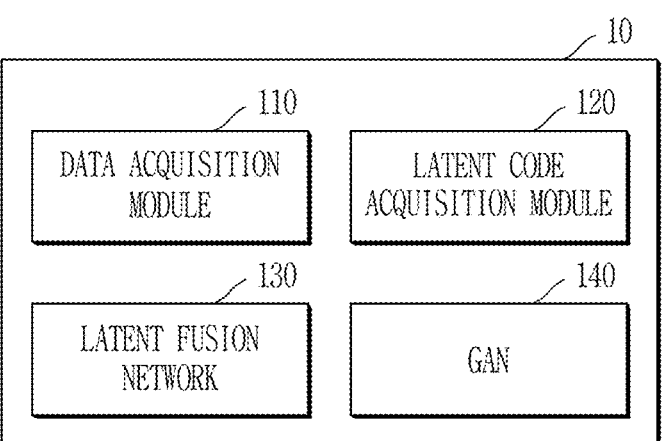
FIG. 1 is a block diagram showing a face image generation device according to an embodiment.

Hereinafter, embodiments of the present disclosure are described in detail with reference to the accompanying drawings so that those skilled in the art to which the present disclosure pertains may easily practice the present disclosure. However, the present disclosure may be implemented in various different forms, and is not limited to the embodiments described herein. In addition, in the drawings, portions unrelated to the description are omitted to clearly describe the present disclosure, and similar portions are denoted by similar reference numerals throughout the specification.

Through the specification and claims, unless explicitly described otherwise, "including" any components will be understood to imply the inclusion of another component rather than the exclusion of another component. Terms including ordinal numbers such as "first", "second", and the like, may be used to describe various components. However, these components are not limited by these terms. These terms are used only to distinguish one component and another component from each other.

Terms such as "~part", "~er/or", and "module" described in the specification may refer to a unit capable of processing at least one function or operation described in the specification, which may be implemented as hardware, a circuit, software, or a combination of hardware or circuit and software. In addition, at least some components or functions of the method and the device for generating a controllable talking face image according to the embodiments described below may be implemented as a program or software, and the program or software may be stored in a computer-readable medium.

FIG. 1 is a block diagram showing a face image generation device according to an embodiment.

Referring to FIG. 1, a face image generation device 10 according to an embodiment may execute program code loaded in at least one memory device by at least one processor. For example, the face image generation device 10 may be implemented as a computing device 50 as described below with reference to FIG. 10. In this case, at least one processor may correspond to a processor 510 of the computing device 50, and at least one memory device may correspond to a memory 530 of the computing device 50. The program code may be executed by at least one processor to thus generate a controllable talking face image. In the specification, the term "module" is used to logically distinguish functions performed by the program codes.

The face image generation device 10 according to an embodiment may generate the talking face having a controllable facial motion by manipulating a latent space for face image generation. In detail, the face image generation device 10 may establish a canonical space where all faces have the same motion pattern and different identities, while exploring a multimodal motion space that represents only a motion-related feature while removing the identity. In addition, the face image generation device 10 may inject a constraint on orthogonality between two different latent spaces to separate the identity and the motion from each other. Accordingly, the face image generation device 10 may generate a natural-looking talking face through fully controllable facial attributes and accurate lip synchronization. To this end, the face image generation device 10 may include a data acquisition module 110, a latent code acquisition module 120, a latent fusion network 130, and a generative adversarial network (GAN) 140.

The data acquisition module 110 may acquire data on images and audio from a video. In detail, the data acquisition module 110 may receive a source image $x_s$ and a series of driving images $x_d$, sampled from the same video, and input audio $x_a$. Here, the source image $x_s$ may represent one image including a face extracted from the video, and the series of driving image $x_d$ represents a plurality of image frames extracted from the same video and including a face having a motion.

The latent code acquisition module 120 may acquire a latent code from the source image $x_s$, the series of driving images $x_d$, and the input audio $x_a$. In detail, the latent code acquisition module 120 may acquire a style latent code including a source latent code $z_s$ and a driving latent code $z_d$ by encoding the source image $x_s$ and the series of driving images $x_d$ into a visual space by a visual encoder $E_{inv}$.

In some embodiments, the visual encoder $E_{inv}$, which encodes the source image $x_s$ to generate the source latent code $z_s$, and the visual encoder $E_{inv}$, which encodes the series of driving images $x_d$ to generate the driving latent code $z_d$, may share a weight. Alternatively, one visual encoder $E_{inv}$ may be used to encode the source image $x_s$ to thus generate the source latent code $z_s$ and encode the series of driving images $x_d$ to thus generate the driving latent code $z_d$.

Meanwhile, the latent code acquisition module 120 may acquire an audio feature including an audio latent code $z_a$ by encoding the input audio $x_a$ by an audio encoder $E_a$.

The latent fusion network 130 may manipulate the latent space based on the source latent code $z_s$, the driving latent code $z_d$, and the audio latent code $z_a$, acquired by the latent code acquisition module 120 to thus generate a multimodal fused latent code $z_{s \to d}$ to be delivered to the GAN 140.

The latent fusion network 130 may acquire a canonical code $z_{s \to c}$ from the source latent code $z_s$, acquire a motion code $z_{c \to d}$ by combining the driving latent code $z_d$ with the audio latent code $z_a$, and acquire the multimodal fused latent code $z_{s \to d}$ by combining the canonical code $z_{s \to c}$ with the motion code $z_{c \to d}$.

In detail, the latent fusion network 130 may acquire the canonical code $z_{s \to c}$ by mapping the source latent code $z_s$ to the canonical space by a canonical encoder $E_{can}$. In the canonical space, each face may have the same lip shape and pose while having a different identity, by the canonical encoder $E_{can}$. In some embodiments, the canonical encoder $E_{can}$ may include two multilayer perceptrons (MLPs).

Meanwhile, the latent fusion network 130 may acquire the motion code $z_{c \to d}$ by combining the driving latent code $z_d$ with the audio latent code $z_a$, and mapping the combined code to a multimodal motion space by a multimodal motion encoder $E_m$. In some embodiments, the multimodal motion encoder $E_m$ may include three multilayer perceptrons.

In some embodiments, the latent fusion network 130 may acquire the motion code $z_{c \to d}$ according to Equation 1 below in order for the combined code to include only a motion feature when combining the driving latent code $z_d$ with the audio latent code $z_a$.

$$z_{c \to d} = E_m(E_a(x_a) \oplus E_{inv}(x_d)) \qquad \text{(Equation 1)}$$

Here, $z_{c \to d}$ is the motion code, $E_m$ is the multimodal motion encoder, $E_a$ is the audio encoder, $E_{inv}$ is the visual encoder, $x_a$ is the input audio, $x_d$ represents the series of driving images, and $\oplus$ represents channel-wise concatenation.

Meanwhile, the latent fusion network 130 may acquire the multimodal fused latent code $z_{s \to d}$ by combining the canonical code $z_{s \to c}$ with the motion code $z_{c \to d}$. In some embodiments, the latent fusion network 130 may acquire the multimodal fused latent code $z_{s \to d}$ by combining the canonical code $z_{s \to c}$ with the motion code $z_{c \to d}$ by a linear operation.

Alternatively, in some embodiments, the latent fusion network 130 may acquire the multimodal fused latent code $z_{s \to d}$ by 2-stage motion transfer according to Equation 2 below. Directly exploring the multimodal fused latent code $z_{s \to d}$ in the latent space is very difficult because the direct exploration is only possible when a model represents a detailed facial attribute while capturing a complex distribution of the motion. To solve these problems, it is possible to acquire the multimodal fused latent code $z_{s \to d}$ through the 2-stage motion transfer by assuming the existence of a canonical image xc in the canonical space, which is the latent space that has unified motions related to the face and an individual identity.

$$z_{s \to d} = z_{s \to c} + z_{c \to d} \qquad \text{(Equation 2)}$$

Here, $z_{s \to d}$ is the multimodal fused latent code, $z_{s \to c}$ is the canonical code and represents conversion from the source image $x_s$ to the canonical image, and $z_{c \to d}$ is the motion code and represents conversion from the canonical image to the series of driving images $x_d$.

The latent fusion network 130 may impose the constraint to ensure the orthogonality in which an identity feature and the motion feature are distinguished from each other between the canonical code $z_{s \to c}$ and the motion code $z_{c \to d}$. Imposing the constraint in this way may be important for generating the natural-looking talking face through the fully-controllable facial attributes and the accurate lip synchronization. The face image generation device 10 may impose the orthogonality constraint on a correlation between the canonical space that only includes a person-specific characteristic of a style latent space and the multimodal motion space that includes person-agnostic motion feature encoded from a driving pose video and an audio source to explicitly separate the canonical space and the multimodal motion space from each other, thereby generating a detailed and controllable facial animation without mixing the motion and audio characteristics.

In some embodiments, the latent fusion network 130 may introduce orthogonality loss $L_{ortho}$ according to Equation 3 below to ensure the orthogonality.

$$L_{ortho} = \frac{1}{N} \sum (z_{s \to c} \odot z_{c \to d}) \qquad \text{(Equation 3)}$$

Here, N is the number of channels of the latent code, $z_{s \to c}$ is the canonical code, $z_{c \to d}$ is the motion code, and $\odot$ represents Hadamard product.

In some embodiments, the orthogonality loss $L_{ortho}$ may be introduced by being included in an overall loss in the form of combining other losses with the orthogonality loss $L_{ortho}$, as shown in Equation 4 below.

$$L_{total} = \qquad \text{(Equation 4)}$$
$$\lambda_1 L_{ortho} + \lambda_2 L_{sync} + \lambda_3 L_{id} + \lambda_4 L_{L1} + \lambda_5 L_{LPIPS} + \lambda_6 L_{GAN}$$

Here, $L_{total}$ is the overall loss, $L_{sync}$ is synchronization loss, $L_{id}$ is identity loss, $L_{L1}$ is reconstruction loss, $L_{LPIPS}$ is perceptual loss, and $L_{GAN}$ is adversarial loss, $\lambda$ may be a hyperparameter introduced to balance scales of the respective losses. Each $\lambda$ may control relative importance of its corresponding loss term. In some embodiments, $\lambda_1$, $\lambda_2$, $\lambda_3$, $\lambda_4$, $\lambda_5$, and $\lambda_6$ may respectively be set to 1, 0.1, 0.5, 1, 1, and 0.1.

The multimodal fused latent code $z_{s \to d}$ may be transferred to the GAN 140 to thus generate the talking face image. The GAN 140 may include a generator G, a discriminator D and a pre-trained encoder, and the generator G may generate generated data based on the multimodal fused latent code $z_{s \to d}$, and perform learning until the generated data is identified as real data by the discriminator D. The discriminator D may receive original data and the generated data provided by the generator G, and discriminate whether the generated data is the real data or fake data. The discriminator D may perform the learning until the discriminator D has higher authenticity discrimination accuracy of the generated data. After completing its learning, the generator G may generate a video $x_g$ including the talking face image.

In some embodiments, the multimodal fused latent code $z_{s \to d}$ may be refined through a temporal fusion layer and then transferred to the GAN 140. Refining here may indicate fitting a dimension or extracting a useful feature. In some embodiments, the temporal fusion layer may include a one-dimensional convolution layer.

The device 10 according to this embodiment is designed to pursue the canonical space for separating a visual feature from the person-specific characteristic through latent space exploration to thus generate all facial expressions while synchronizing a mouth movement with an input audio source, and may generate more detailed and controllable facial animation while preventing unwanted mixing of different types of conditions. In addition, the device 10 may be particularly useful for providing personalized digital avatar or virtual assistant that may communicate and interact with a user in a more natural and realistic way.

FIGS. 2, 3, 4, and 5 are diagrams for explaining the face image generation device according to an embodiment.

Figure 2:
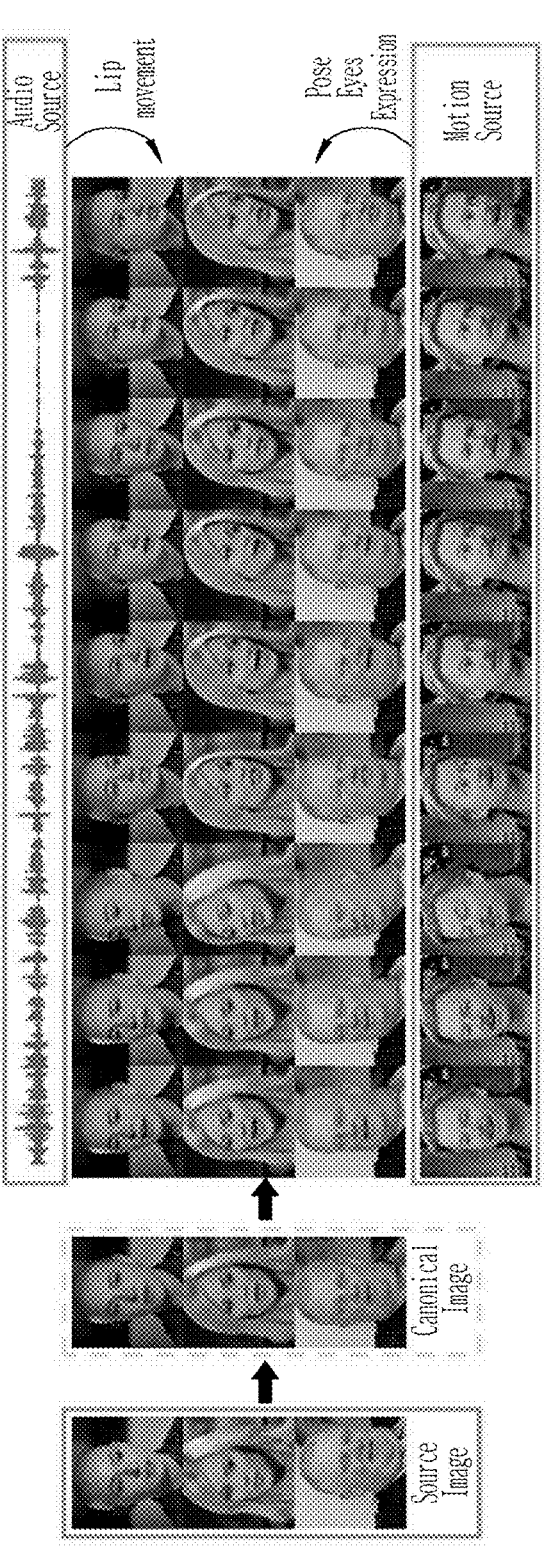

Referring to FIG. 2, the face image generation device according to an embodiment may accurately reflect all the facial expressions of a motion source and synchronize a lip shape with the input audio source. To this end, the face image generation device may find a standard space where all faces have the same motion pattern and different identities.

Figure 3:
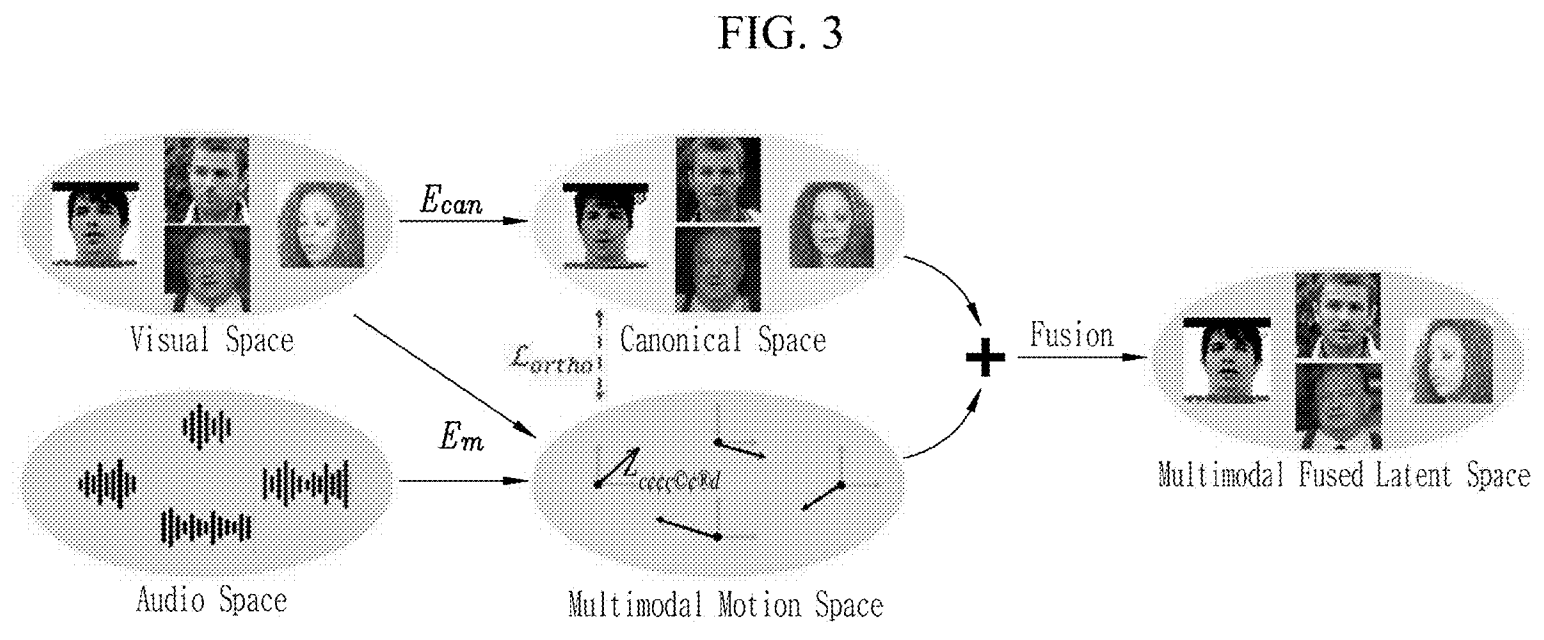

Referring to FIG. 3, the face image generation device according to an embodiment may transfer an individual portrait movement through the latent space exploration. An entire pipeline may largely include two stages, and a first stage may be a stage of transmitting a style latent space code to a canonical latent space. Here, all the faces may have the same facial attributes such as the same lip shape, head posture, and eye blinking. A second stage may be a stage of exploring the multimodal motion space where each code includes only motion information and excludes identity information. A target motion code may be acquired by fusing an image latent feature and an audio latent feature. The canonical code and the motion code may then be combined with each other by the linear operation to ultimately generate the multimodal fused latent code. The fused latent code may be input to a decoder and used to synthesize an attribute-controllable talking face video.

Figure 4:
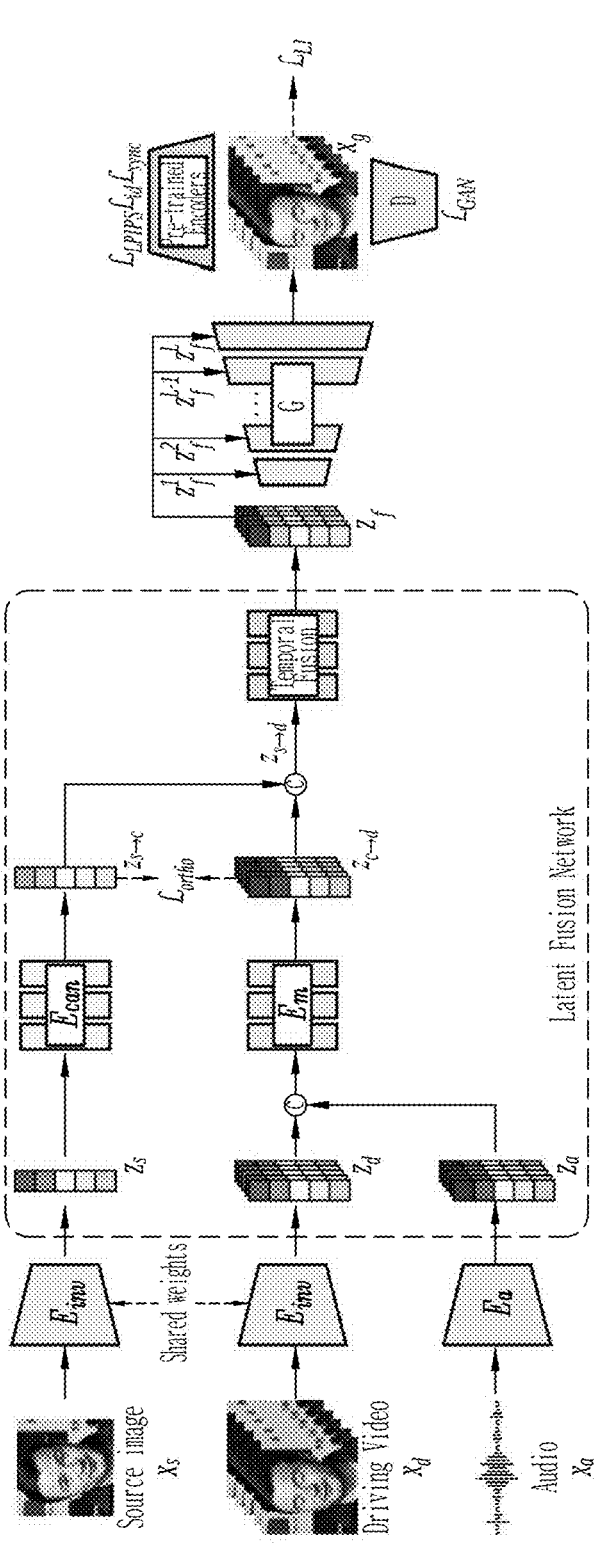

Referring to FIG. 4, the face image generation device according to an embodiment may include the visual encoder $E_{inv}$, the audio encoder $E_a$, the generator G, the discriminator D, and the latent fusion network. In this embodiment, for brevity, one visual encoder $E_{inv}$ may be used to extract the source latent code $z_s$ and the driving latent code $z_d$. The audio encoder $E_a$ may extract the audio latent code $z_a$.

The canonical encoder $E_{can}$ may map the source latent code $z_s$ to the canonical space and generate the canonical code $z_{s \to c}$, and the canonical code $z_{s \to c}$ may be linearly combined with the motion code $z_{c \to d}$. The motion code $z_{c \to d}$ may be generated by the multimodal motion encoder $E_m$, which combines the driving latent code $z_d$ with the audio latent code $z_a$.

To generate a natural movement, the multimodal fused latent code $z_{s \to d}$ may pass through the temporal fusion layer before being transferred to the generator G. The generated video $x_g$ may be compared with the driving latent code $z_d$ in terms of visual and synchronization quality. In this embodiment, a StyleGAN2 generator is used as the decoder to control coarse-fine motion transfer, and L represents the number of modulation layers in the generator. Accordingly, the canonical encoder $E_{can}$ and the multimodal motion encoder $E_m$ of the latent fusion network may each have L independent weights.

Figure 5:
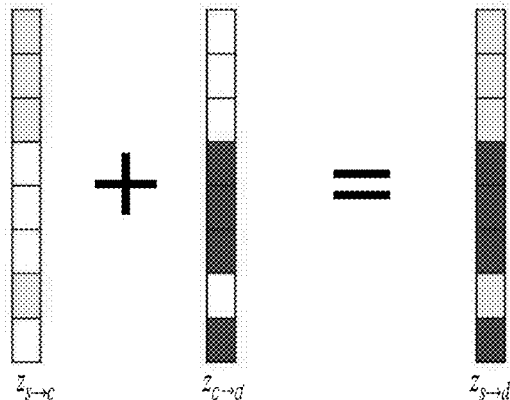

Referring to FIG. 5, it may be seen that the orthogonality is ensured in the combination of the canonical code $z_{s \to c}$ and the motion code $z_{c \to d}$. Accordingly, the canonical code, which includes the person-specific characteristics such as a face shape and texture, may be independent of a multimodal movement code, which encodes the target movements such as the head pose, the facial expression, and gaze. As described above, it is possible to apply the orthogonality between the two codes to thus generate the more controllable facial animation while preventing the unwanted mixing of the different types of conditions.

Figure 6:
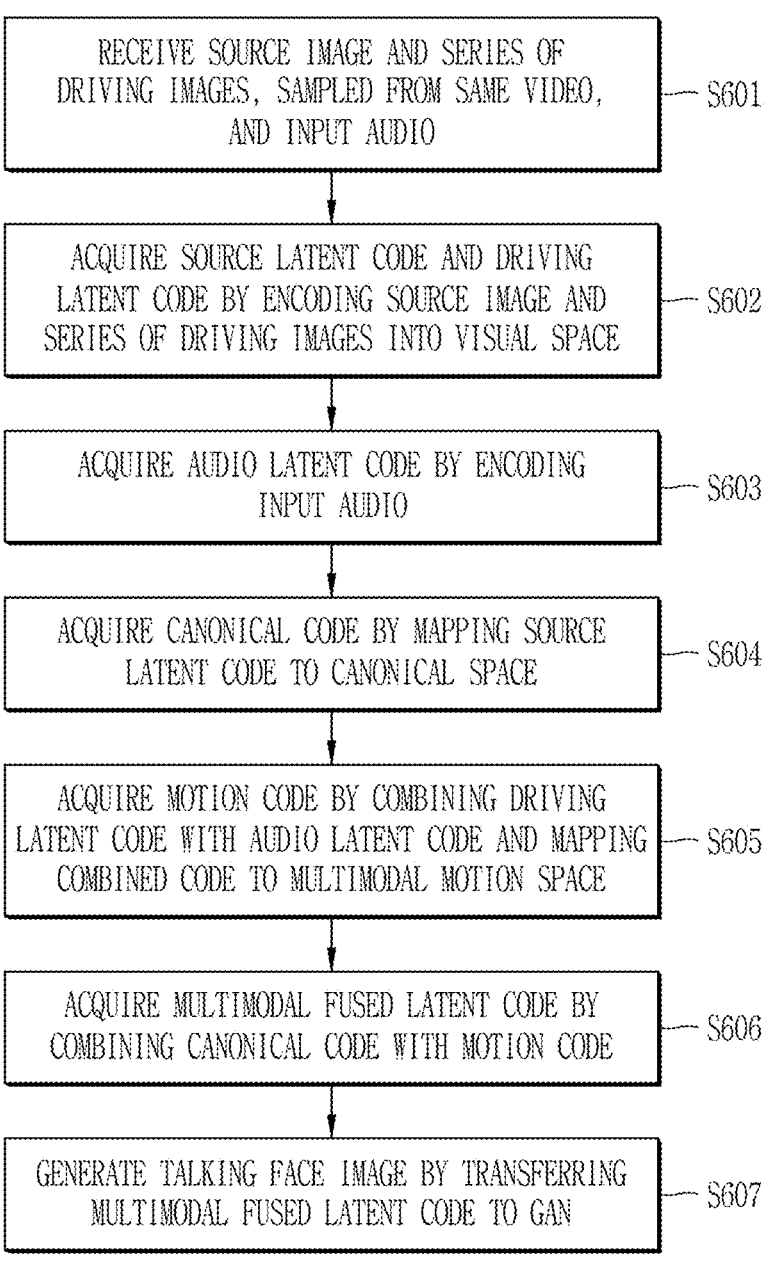
FIG. 6 is a flowchart showing a face image generation method according to an embodiment.

FIG. 6 is a flowchart showing a face image generation method according to an embodiment.

Referring to FIG. 6, the face image generation method according to an embodiment may include: receiving a source image and a series of driving images, sampled from the same video, and an input audio (S601); acquiring a source latent code and a driving latent code by encoding the source image and the series of driving images into a visual space (S602); acquiring an audio latent code by encoding the input audio (S603); acquiring a canonical code by mapping the source latent code to a canonical space (S604); acquiring a motion code by combining the driving latent code with the audio latent code and mapping the combined code to a multimodal motion space (S605); acquiring a multimodal fused latent code by combining the canonical code with the motion code (S606); and generating a talking face image by transferring the multimodal fused latent code to a generative adversarial network (GAN) (S607).

Specific details of the method may refer to the descriptions of the embodiments described in the specification, and the description provided here thus omits a redundant description thereof.

Figure 7:
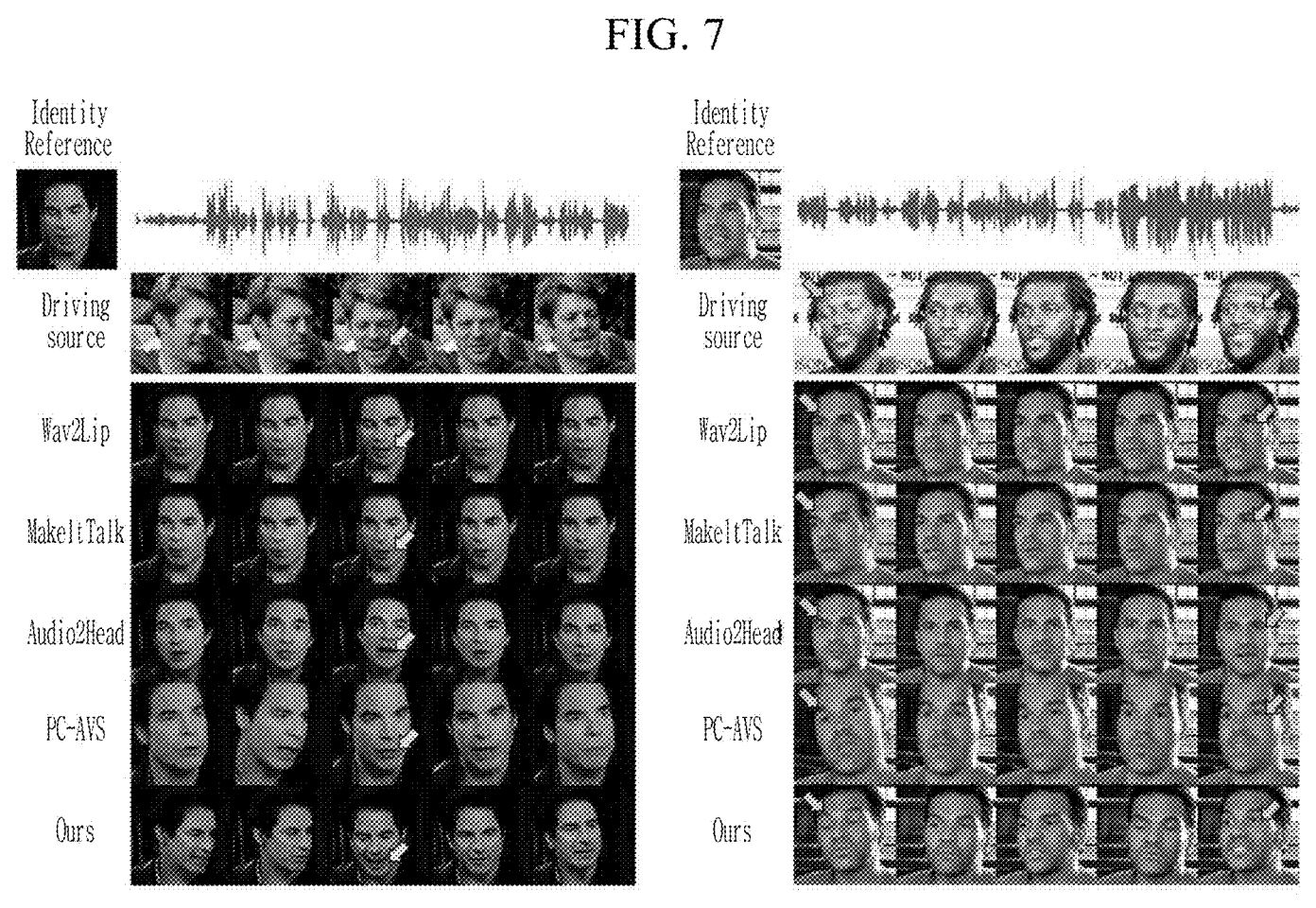
Figure 8:
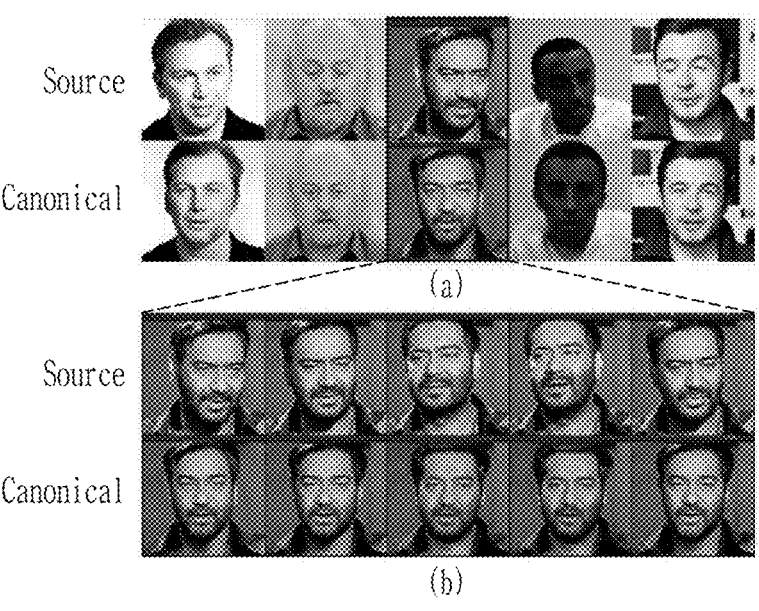
Figure 9:

FIGS. 7, 8, and 9 are diagrams for explaining effective aspects of the face image generation device and method according to the embodiments.

Table 1 below shows a result of comparing the method according to the embodiments (FC-TFG (Ours)) and four different methods (Wav2Lip, MakeItTalk, Audio2Head, and PC-AVS) by using six metrics (SSIM, MS-SSIM, PSNR, LMD, and LSE-C).

10

Figure 10:
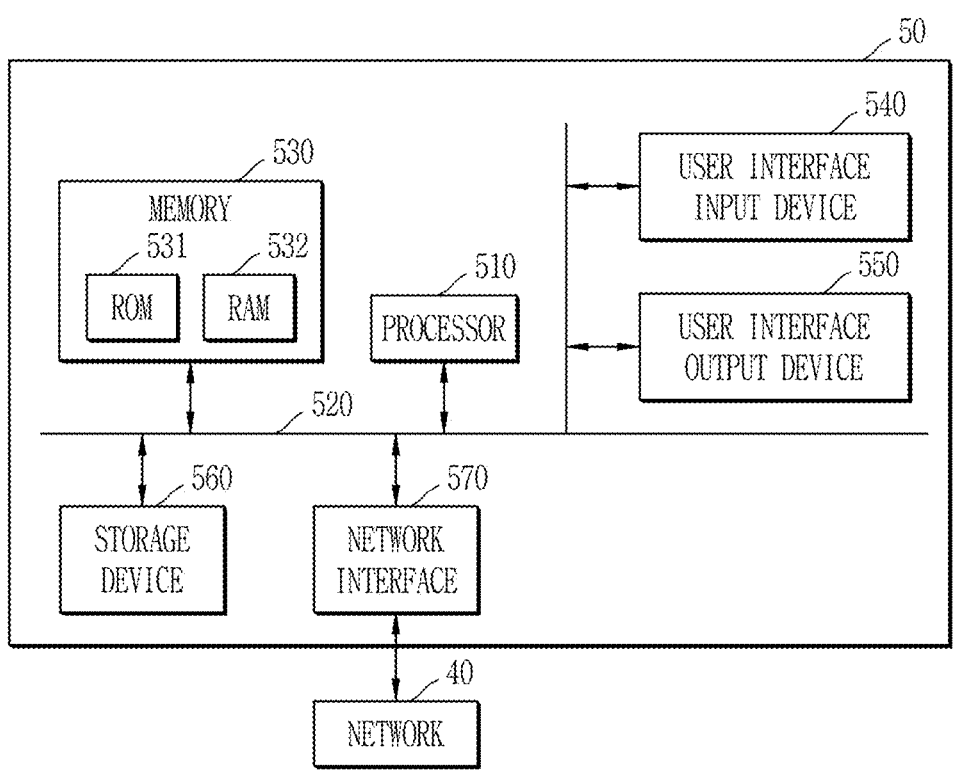
FIG. 10 is a diagram for explaining a computing device according to an embodiment.

Referring to FIG. 10, the method and the device for generating a controllable talking face image according to the embodiments may be implemented using the computing device 50.

The computing device 50 may include at least one of the processor 510, the memory 530, a user interface input device 540, a user interface output device 550, and a storage device 560, performing their communications by using a bus 520. The computing device 50 may also include a network interface 570 electrically connected to a network 40. The network interface 570 may transfer or receive a signal with another entity through the network 40.

The processor 510 may be implemented in any of various types such as a micro controller unit (MCU), an application processor (AP), a central processing unit (CPU), a graphic processing unit (GPU), a neural processing unit (NPU), and a quantum processing unit (QPU), and the memory 530 may be any semiconductor device executing an instruction stored in the storage device 560. The processor 510 may implement the functions and methods described above with respect to FIGS. 1 through 9.

TABLE 1

| Method | Controllable Motions | | | | Metrics | | | | |
| | lip | pose | eye blink | eye gaze | SSIM↑ | MS-SSIM↑ | PSNR↑ | LMD↓ | LSE-C↑ |
| --- | --- | --- | --- | --- | --- | --- | --- | --- | --- |
| Wav2Lip | ✓ | | | | 0.58 | — | 20.63 | 2.65 | 8.66 |
| MakeItTalk | ✓ | | | | 0.55 | 0.45 | 16.94 | 3.28 | 3.83 |
| Audio2Head | ✓ | | | | 0.51 | 0.40 | 15.98 | 3.58 | 5.79 |
| PC-AVS | ✓ | ✓ | | | 0.57 | 0.60 | 17.37 | 2.25 | 5.82 |
| FC-TFG(Ours) | ✓ | ✓ | ✓ | ✓ | 0.69 | 0.77 | 21.22 | 1.58 | 8.46 |

The result according to the embodiments shows improvements in terms of the visual quality and lip synchronization. Simultaneously, it may be seen that various and detailed facial motions may be controlled.

Referring to FIG. 7, it may be seen that the accuracies in the head movement and the facial expression that follow any given conditions are improved, and Wav2Lip, MakeItTalk, or Audio2Head fail to generate the accurate head movement from a driving source video. In the case of PC-AVS, it may be seen that the facial expression is not realistic although a similar head movement is shown. In addition, PC-AVS successfully synchronizes the lips to the input audio source.

Referring to FIG. 8, the method according to embodiments may preserve the identity by mapping the various identities to the canonical space. Part (a) of FIG. 8 shows a result of generating various canonical image samples having the plurality of identities by transferring the respective canonical codes to the generator according to the embodiments, and part (b) of FIG. 8 shows additional visualization of all canonical image forms in one video. These results show that the method according to the embodiments not only stably maintain the source identity, but also effectively generalize the various identities.

Referring to FIG. 9, the method according to the embodiments may strengthen the orthogonality between the canonical space and the multimodal motion space, thereby effectively distinguishing the identity and the motion information from each other. This effect may be proved by a cohesive and consistent motion pattern in the canonical space, which is not achieved in a model trained without the orthogonality constraint.

FIG. 10 is a diagram for explaining a computing device according to an embodiment.

The memory 530 and the storage device 560 may include various types of volatile or non-volatile storage media. For example, the memory may include a read only memory (ROM) 531 and a random access memory (RAM) 532. In some embodiments, the memory 530 may be disposed inside or outside the processor 510, and may be connected to the processor 510 through various means that are well-known.

In some embodiments, at least some components or functions of the method and the device for generating a controllable talking face image according to the embodiments may be implemented as a program or software executed by the computing device 50, and the program or software may be stored in a computer-readable medium. In detail, the computer-readable medium according to an embodiment may have a program for executing steps included in the method and the device for generating a controllable talking face image according to the embodiments that is recoded on a computer including the processor 510 executing the program or instruction stored in the memory 530 or the storage device 560.

In some embodiments, at least some components or functions of the method and the device for generating a controllable talking face image according to the embodiments may be implemented using the hardware or circuitry of the computing device 50, or implemented using separate hardware or circuitry that may be electrically connected to the computing device 50.

As set forth above, the method and the device according to the embodiments are designed to pursue the canonical space for separating the visual feature from the person-specific characteristic through the latent space exploration to thus generate all the facial expressions while synchronizing the mouth movement with the input audio source, and may generate the more detailed and controllable the facial animation while preventing the unwanted mixing of the different types of conditions. In addition, the method and the device may be particularly useful for providing the personalized digital avatar or virtual assistant that may communicate and interact with the user in the more natural and realistic way.

Although the embodiments of the present disclosure have been described in detail hereinabove, the scope of the present disclosure is not limited thereto. That is, various modifications and alterations made by those skilled in the art to which the present disclosure pertains by using a basic concept of the present disclosure as defined in the following claims also fall within the scope of the present disclosure.

What is claimed is:

1. A face image generation method for generating a controllable talking face image, the method comprising:
　　receiving a source image and a series of driving images, sampled from the same video, and input audio;
　　acquiring a style latent code including a source latent code and a driving latent code by encoding the source image and the series of driving images into a visual space by a visual encoder;
　　acquiring an audio feature including an audio latent code by encoding the input audio by an audio encoder;
　　acquiring a canonical code by mapping the source latent code to a canonical space by a canonical encoder;
　　acquiring a motion code by combining the driving latent code with the audio latent code, and mapping the combined code to a multimodal motion space by a multimodal motion encoder;
　　acquiring a multimodal fused latent code by combining the canonical code with the motion code; and
　　generating a talking face image by transferring the multimodal fused latent code to a generative adversarial network (GAN).

2. The method of claim 1, wherein
in the acquiring of the multimodal fused latent code,
the multimodal fused latent code is acquired by combining the canonical code with the motion code by a linear operation.

3. The method of claim 2, wherein
in the acquiring of the multimodal fused latent code,
the multimodal fused latent code is acquired through 2-stage motion transfer according to Equation 1 below:

$$z_{s \to d} = z_{s \to c} + z_{c \to d} \qquad \text{(Equation 1)}$$

where $z_{s \to d}$ is the multimodal fused latent code, $z_{s \to c}$ is the canonical code and represents conversion from the source image to the canonical image, and $z_{c \to d}$ is the motion code and represents conversion from the canonical image to the series of driving images.

4. The method of claim 1, wherein
in the acquiring of the motion code,
the motion code is acquired according to Equation 2 below in order for the combined code to include only a motion feature when combining the driving latent code with the audio latent code:

$$z_{c \to d} = E_m(E_a(x_a) \oplus E_{inv}(x_d)) \qquad \text{(Equation 2)}$$

where $z_{c \to d}$ is the motion code, $E_m$ is the multimodal motion encoder, $E_a$ is the audio encoder, $E_{inv}$ is the visual encoder, $x_a$ is the input audio, $x_d$ represents the series of driving images, and $\oplus$ represents channel-wise concatenation.

5. The method of claim 1, further comprising
imposing a constraint to ensure orthogonality in which an identity feature and a motion feature are distinguished from each other between the canonical code and the motion code.

6. The method of claim 5, wherein
in the imposing of the constraint,
orthogonality loss is introduced according to Equation 3 below to ensure the orthogonality:

$$L_{ortho} = \frac{1}{N} \sum (z_{s \to c} \odot z_{c \to d}) \qquad \text{(Equation 3)}$$

where N is the number of channels of the latent code, $z_{s \to c}$ is the canonical code, $z_{c \to d}$ is the motion code, and $\odot$ represents Hadamard product.

7. The method of claim 1, wherein
the canonical encoder includes two multilayer perceptrons (MLPs).

8. The method of claim 1, wherein
the multimodal motion encoder includes three multilayer perceptrons.

9. The method of claim 1, wherein
in the generating of the talking face image,
the talking face image is generated by transferring the multimodal fused latent code refined through a temporal fusion layer to the GAN.

10. The method of claim 9, wherein
the temporal fusion layer includes a one-dimensional convolution layer.

11. A face image generation device for generating a controllable talking face image, which executes a program code loaded in at least one memory device by at least one processor,
　　wherein the program code is executed to
　　receive a source image and a series of driving images, sampled from the same video, and input audio,
　　acquire a style latent code including a source latent code and a driving latent code by encoding the source image and the series of driving images into a visual space by a visual encoder,
　　acquire an audio feature including an audio latent code by encoding the input audio by an audio encoder,
　　acquire a canonical code by mapping the source latent code to a canonical space by a canonical encoder,
　　acquire a motion code by combining the driving latent code with the audio latent code, and mapping the combined code to a multimodal motion space by a multimodal motion encoder,
　　acquire a multimodal fused latent code by combining the canonical code with the motion code, and
　　generate a talking face image by transferring the multimodal fused latent code to a generative adversarial network (GAN).

12. The device of claim 11, wherein
to acquire the multimodal fused latent code includes
that the multimodal fused latent code is acquired by combining the canonical code with the motion code by a linear operation.

13. The device of claim 12, wherein to acquire the multimodal fused latent code includes that the multimodal fused latent code is acquired through 2-stage motion transfer according to Equation 1 below:

$$z_{s \to d} = z_{s \to c} + z_{c \to d} \qquad \text{(Equation 1)}$$

where $z_{s \to d}$ is the multimodal fused latent code, $z_{s \to c}$ is the canonical code and represents conversion from the source image to the canonical image, and $z_{c \to d}$ is the motion code and represents conversion from the canonical image to the series of driving images.

14. The device of claim 11, wherein to acquire the motion code includes that the motion code is acquired according to Equation 2 below in order for the combined code to include only a motion feature when combining the driving latent code with the audio latent code:

$$z_{c \to d} = E_m(E_a(x_a) \oplus E_{inv}(x_d)) \qquad \text{(Equation 2)}$$

where $z_{c \to d}$ is the motion code, $E_m$ is the multimodal motion encoder, $E_a$ is the audio encoder, $E_{inv}$ is the visual encoder, $x_a$ is the input audio, $x_d$ represents the series of driving images, and $\oplus$ represents channel-wise concatenation.

15. The device of claim 11, wherein the program code is executed to impose a constraint to ensure orthogonality in which an identity feature and a motion feature are distinguished from each other between the canonical code and the motion code.

16. The device of claim 15, wherein to impose the constraint includes that orthogonality loss is introduced according to Equation 3 below to ensure the orthogonality:

$$L_{ortho} = \frac{1}{N} \sum (z_{s \to c} \odot z_{c \to d}) \qquad \text{(Equation 3)}$$

where N is the number of channels of the latent code, $z_{s \to c}$ is the canonical code, $z_{c \to d}$ is the motion code, and $\odot$ represents Hadamard product.

17. The device of claim 11, wherein the canonical encoder includes two multilayer perceptrons (MLPs).

18. The device of claim 11, wherein the multimodal motion encoder includes three multilayer perceptrons.

19. The device of claim 11, wherein to generate the talking face image includes that the talking face image is generated by transferring the multimodal fused latent code refined through a temporal fusion layer to the GAN.

20. The device of claim 19, wherein the temporal fusion layer includes a one-dimensional convolution layer.

\* \* \* \* \*